US009256405B1

(12) United States Patent
Modi et al.

(10) Patent No.: US 9,256,405 B1
(45) Date of Patent: Feb. 9, 2016

(54) CODE GENERATION BASED ON REGIONAL UPSAMPLING-BASED DELAY INSERTION

(71) Applicant: The MathWorks, Inc., Natick, MA (US)

(72) Inventors: Sankalp S. Modi, Acton, MA (US); Wang Chen, Brookline, MA (US); Zhihong Zhao, Newton, MA (US); Partha Biswas, Wayland, MA (US)

(73) Assignee: The MathWorks, Inc., Natick, MA (US)

( * ) Notice: Subject to any disclaimer, the term of this patent is extended or adjusted under 35 U.S.C. 154(b) by 27 days.

(21) Appl. No.: 14/185,510

(22) Filed: Feb. 20, 2014

Related U.S. Application Data (60) Provisional application No. 61/770,763, filed on Feb. 28, 2013, provisional application No. 61/770,767, filed on Feb. 28, 2013.

(51) Int. Cl.
*G06F 9/44* (2006.01)
(52) U.S. Cl.
CPC ....................................... *G06F 8/35* (2013.01)
(58) Field of Classification Search
None
See application file for complete search history.

(56) References Cited

U.S. PATENT DOCUMENTS

| | | | |
|---|---|---|---|
| 6,310,566 B1* | 10/2001 | McNeely | 341/123 |
| 8,289,195 B1* | 10/2012 | Dong et al. | 341/61 |
| 8,369,973 B2* | 2/2013 | Risbo | 700/94 |
| 8,694,947 B1* | 4/2014 | Venkataramani et al. | 716/132 |
| 2003/0025620 A1* | 2/2003 | Bland | 341/61 |
| 2008/0240317 A1* | 10/2008 | Spalink | 375/350 |
| 2009/0013301 A1* | 1/2009 | Ogilvie et al. | 716/18 |
| 2010/0125820 A1* | 5/2010 | ispir | 716/2 |
| 2013/0159964 A1* | 6/2013 | Szpak | 717/105 |

OTHER PUBLICATIONS

Wikipedia, "Retiming", http://en.wikipedia.org/wiki/Retiming, Mar. 16, 2013, 3 pages.

* cited by examiner

*Primary Examiner* — Insun Kang
*Assistant Examiner* — Devayani R Talukdar
(74) *Attorney, Agent, or Firm* — Harrity & Harrity, LLP (57) ABSTRACT

A device is configured to receive optimization information associated with a model, determine an amount of delay to be inserted into the model, and determine a sampling factor by which a first data rate associated with a signal is to be modified into a second data rate. The device is configured to determine a region of interest, insert an upsampling block that upsamples the signal entering the region of interest based on the sampling factor, and insert a downsampling block, associated with a unit of delay, which downsamples the signal exiting the region of interest based on the sampling factor. The device is configured to convert the unit of delay into a fast delay block, corresponding to the amount of delay, and insert the fast delay block in the region of interest. The device is configured to generate code associated with the model, and provide the code.

20 Claims, 8 Drawing Sheets

CODE GENERATION BASED ON REGIONAL UPSAMPLING-BASED DELAY INSERTION

RELATED APPLICATION

This application is a non-provisional application claiming priority to U.S. Provisional Patent Application Nos. 61/770,763 and 61/770,767, filed Feb. 28, 2013, the entire contents of which are incorporated herein in their entirety.

DETAILED DESCRIPTION

The following detailed description of example implementations refers to the accompanying drawings. The same reference numbers in different drawings may identify the same or similar elements.

A client device, such as a computer, may receive a model of a system to be implemented on a target platform (e.g., digital hardware). Prior to implementing the model on the target platform, the client device may transform the model to be better suited for optimization. To transform the model for optimization, the client device may insert an additional quantity of delay into the model (e.g., additional seconds, additional cycles, etc.). For example, the client device may insert delay into the model to increase a clock speed associated with the model, to permit a resource associated with the model to be shared by two or more model elements, to introduce a model element having a greater quantity of delay (e.g., delay that is greater than a delay of a model element being replaced), or the like.

However, inserting delay into the model may change the behavioral characteristics of the model. For example, inserting delay into the model may affect the operation of some model elements, such as feedback loops, where the total delay associated with the model element must remain constant. Additionally, inserting delay in the model may increase latency associated with the model (e.g., a measure of delay experienced by the model) beyond a maximum latency allowed in the model (e.g., due to a constraint). Thus, where introducing delay into the model may affect the behavioral characteristics of the model, the client device may not be able to modify the model for optimization (e.g., compared to if the delay were inserted). Implementations described herein may allow a client device to automatically modify a data rate within a region of interest of a model to permit the client device to insert a quantity of delay into the region of interest without affecting the overall behavioral characteristics of the model and/or a portion of the model (e.g., without altering the latency of the model).

Figure 1:
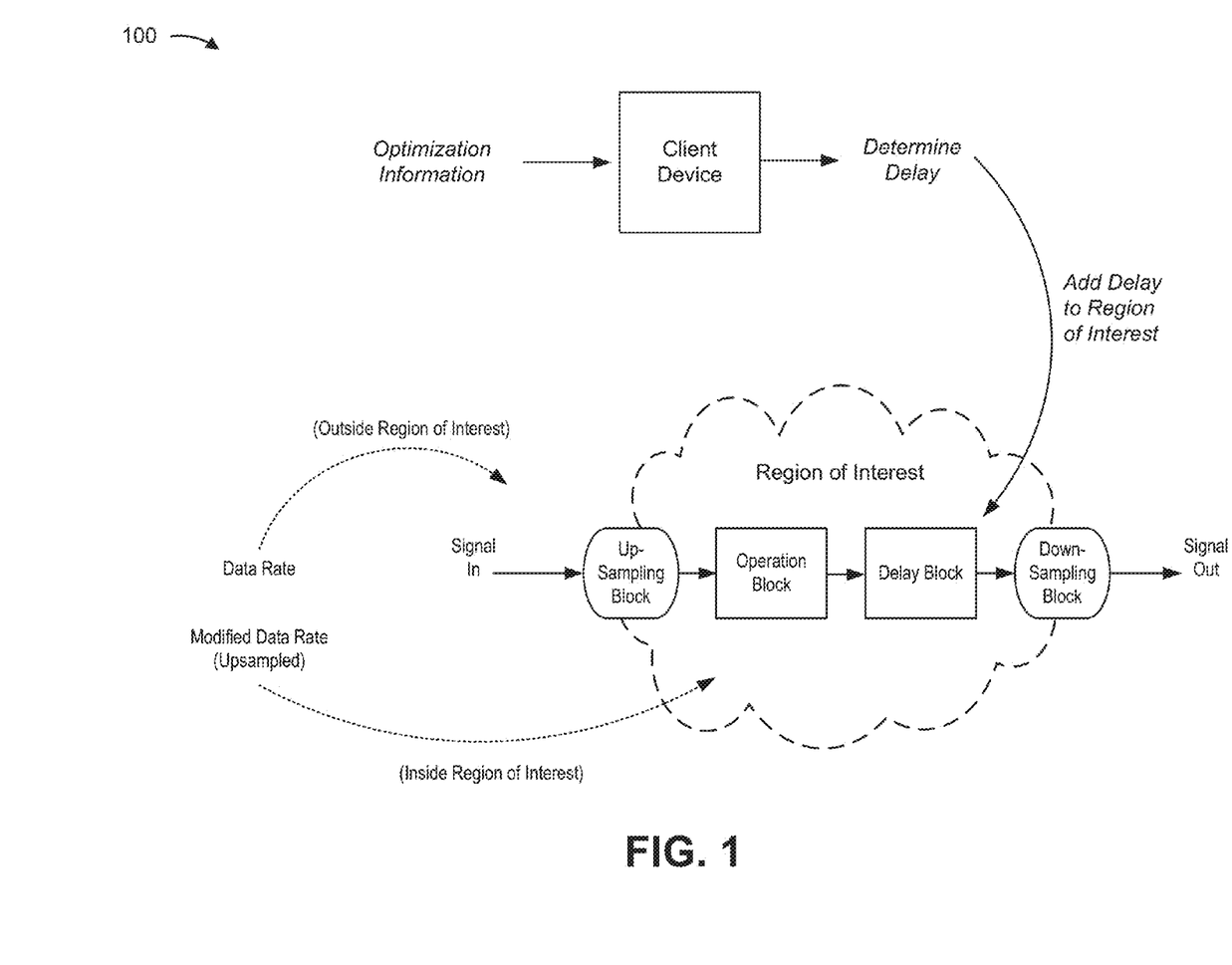
FIG. 1 is a diagram of an overview of an example implementation described herein.

FIG. 1 is a diagram of an overview of an example implementation 100 described herein. As shown in FIG. 1, example implementation 100 may include a client device. The client device may determine an amount of delay, associated with an operation block, to be inserted into a block diagram model.

As shown in FIG. 1, the client device may receive optimization information. The optimization information may include information for optimizing the model (e.g., for pipelining the model, for adding and/or removing a block from the model, for sharing a resource associated with the model, etc.). Based on the optimization information, the client device may determine a quantity of additional data cycles, associated with an operation block, to be added to a particular portion of the model.

As further shown in FIG. 1, the client device may determine a region of interest that includes the operation block. A signal entering the region of interest may be associated with a data rate (e.g., a rate at which information in the model is sampled). The client device may upsample the signal entering the region of interest by increasing the data rate associated with the signal (e.g., via an upsampling block), and may downsample the signal exiting the region of interest by decreasing the data rate associated with the signal (e.g., via a downsampling block). Thus, the part of the model outside of the region of interest may be associated with a data rate, and the part of the model inside the region of interest may be associated with a modified data rate (e.g., an increased data rate). Based on the optimization information, the client device may insert a quantity of delay into the region of interest (e.g., via a delay block). Based on the modified data rate, the part of the model associated with the sampling block may complete additional cycles of operation associated with the delay before downsampling the exiting signal. In this manner, the client device may add a quantity of cycles of operation to a region of interest to permit the behavioral characteristics of the model outside of the region of interest to be unchanged when a delay is inserted.

Figure 2:
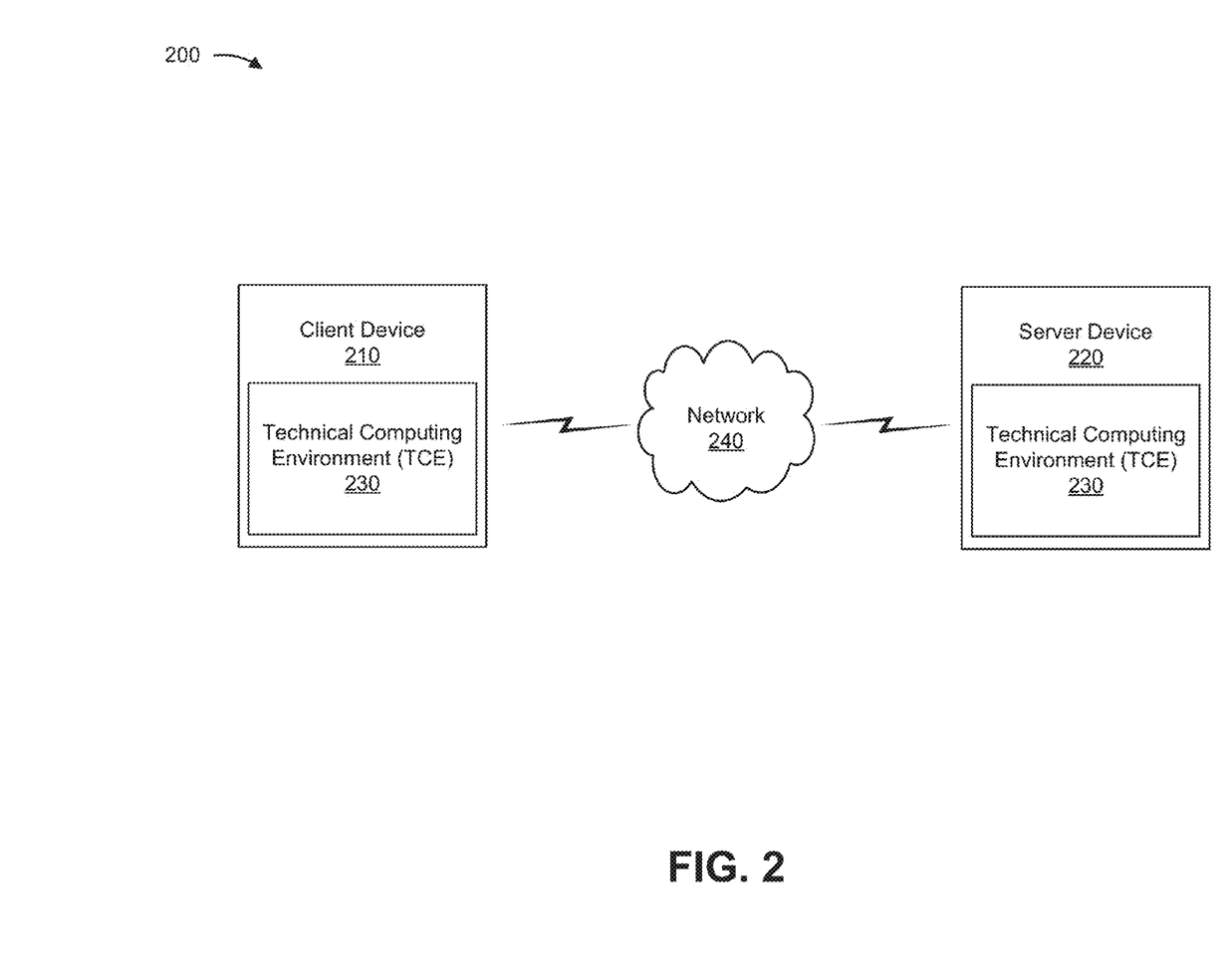
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include client device 210, server device 220, a technical computing environment ("TCE") 230, and network 240. Devices of environment 200 may interconnect via wired connections, wireless connections, or a combination of wired and wireless connections.

Client device 210 may include a device capable of receiving, generating, storing, processing, executing, and/or providing program information, such as information associated with a model. For example, client device 210 may include a computing device, such as a desktop computer, a laptop computer, a tablet computer, a handheld computer, a server, a mobile phone (e.g., a smart phone, a radiotelephone, etc.), or a similar device. In some implementations, client device 210 may receive information from and/or provide information to server device 230.

Server device 220 may include one or more devices capable of receiving, generating, storing, processing, executing, and/or providing information, such as information associated with a model. For example, server device 220 may include a computing device, such as a server, a desktop computer, a laptop computer, a tablet computer, a handheld computer, or a similar device. Server device 220 may receive information from and/or provide information to client device 210.

Client device 210 and/or server device 220 may host TCE 230. TCE 230 may include any hardware-based logic or a combination of hardware and software-based logic that provides a computing environment that allows tasks to be performed (e.g., by users) related to disciplines, such as, but not limited to, mathematics, science, engineering, medicine, and business. TCE 230 may include a text-based environment (e.g., MATLAB® software), a graphically-based environment (e.g., Simulink® software, Stateflow® software, SimEvents® software, etc., by The MathWorks, Inc.; VisSim by Visual Solutions; LabView® by National Instruments; Agilent VEE by Agilent Technologies; Advanced Design System ("ADS") by Agilent Technologies; Agilent Ptolemy by Agilent Technologies; etc.), or another type of environment, such as a hybrid environment that may include, for example, a text-based environment and a graphically-based environment.

For example, TCE 220 may provide mathematical functions and/or graphical tools (e.g., for creating plots, surfaces, images, volumetric representations, etc.). In some implementations, TCE 220 may provide these functions and/or tools using toolboxes (e.g., toolboxes for signal processing, image processing, data plotting, parallel processing, etc.). In some implementations, TCE 220 may provide these functions as block sets or in another way, such as via a library, a local or remote database (e.g., a database operating in a computing cloud), remote procedure calls ("RPCs"), an application programming interface ("API"), etc.

TCE 220 may include a modeling system that may be used in the creation of a functional model and that may enable generation of executable code based on the model. For example, TCE 220 may include a graphical modeling tool or application that provides a user interface for a numerical computing environment. Additionally, or alternatively, TCE 220 may include a graphical modeling tool and/or application that provides a user interface for modeling and simulating (e.g., by executing a model) a dynamic system (e.g., based on differential equations, difference equations, discrete events, discrete states, etc.). Execution of a model to simulate a system may also be referred to as simulating a model. The model may further include static relations (e.g., algebraic relations, stochastic relations, inequalities, etc.).

Network 240 may include one or more wired and/or wireless networks. For example, network 240 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, or a combination of these or other types of networks.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
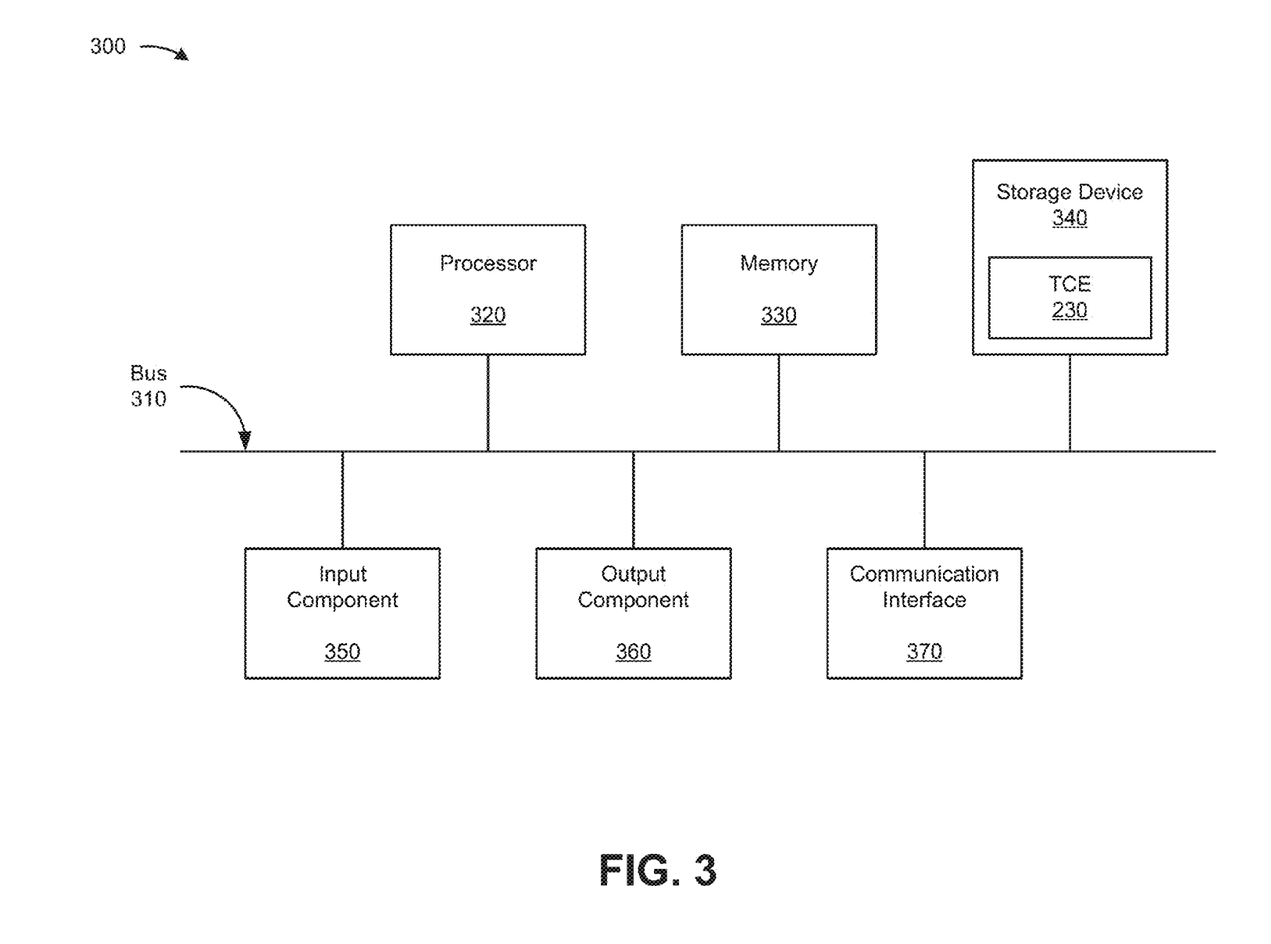
FIG. 3 is a diagram of example components of one or more devices of FIG. 2.

FIG. 3 is a diagram of example components of a device 300. Device 300 may correspond to client device 210 and/or server device 220. Additionally, or alternatively, each of client device 210 and/or server device 220 may include one or more devices 300 and/or one or more components of device 300. As shown in FIG. 3, device 300 may include a bus 310, a processor 320, a memory 330, a storage device 340, an input component 350, an output component 360, and a communication interface 370.

Bus 310 may include a path that permits communication among the components of device 300. Processor 320 may include a processor (e.g., a central processing unit, a graphics processing unit, an accelerated processing unit), a microprocessor, and/or any processing component (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g., a flash, magnetic, or optical memory) that stores information and/or instructions for use by processor 320.

Storage device 340 may store information and/or software related to the operation and use of device 300. For example, storage device 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage device 340 may store TCE 230.

Input component 350 may include a component that permits a user to input information to device 300 (e.g., a touch screen display, a keyboard, a keypad, a mouse, a button, a switch, etc.). Output component 360 may include a component that outputs information from device 300 (e.g., a display, a speaker, one or more light-emitting diodes ("LEDs"), etc.).

Communication interface 370 may include a transceiver-like component, such as a transceiver and/or a separate receiver and transmitter, that enables device 300 to communicate with other devices, such as via a wired connection, a wireless connection, or a combination of wired and wireless connections. For example, communication interface 370 may include an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330 and/or storage device 340. A computer-readable medium may be defined as a non-transitory memory device. A memory device may include memory space within a single physical storage device or memory space spread across multiple physical storage devices.

Software instructions may be read into memory 330 and/or storage device 340 from another computer-readable medium or from another device via communication interface 370. When executed, software instructions stored in memory 330 and/or storage device 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4:
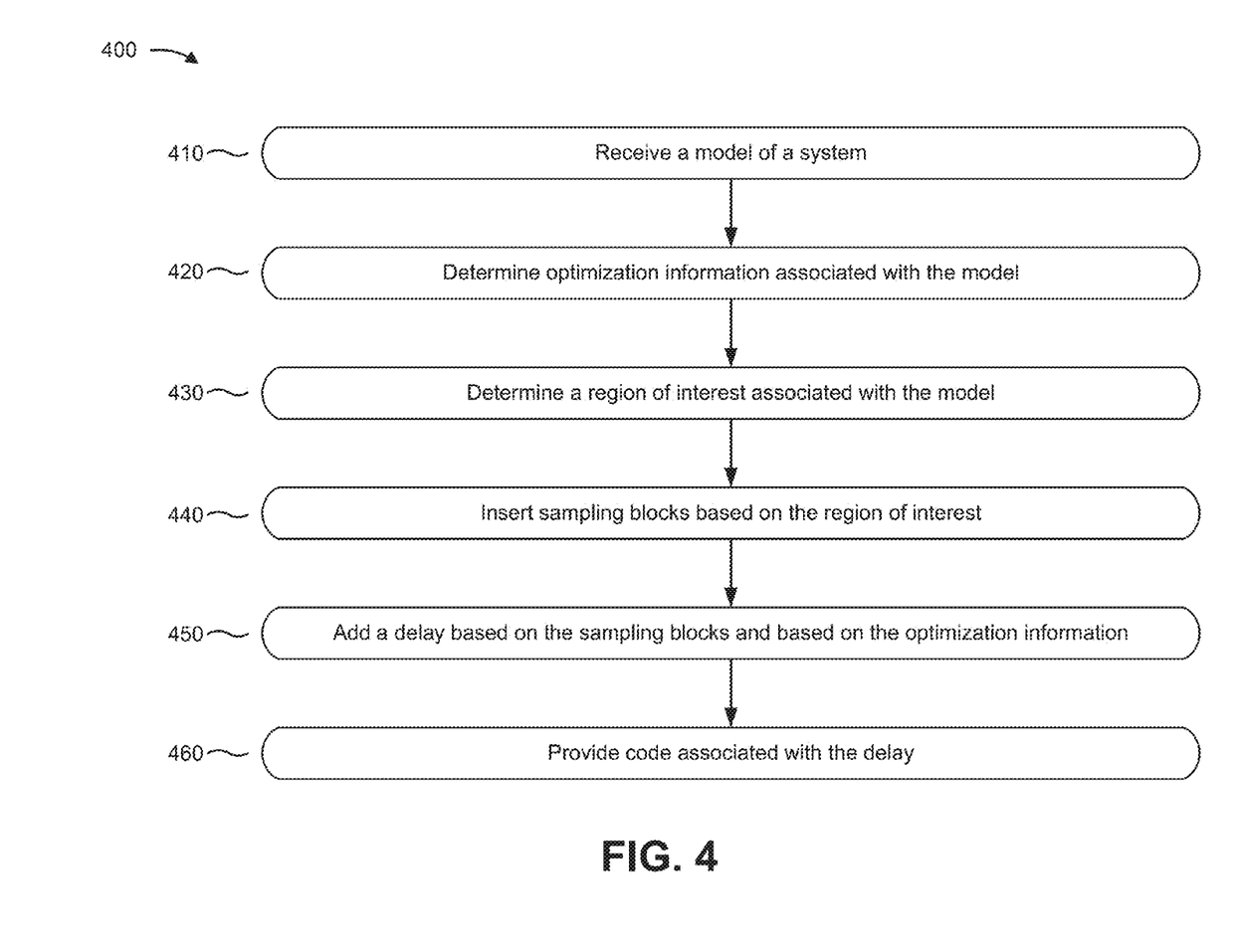
FIG. 4 is a flow chart of an example process for inserting a delay into a model.

FIG. 4 is a flow chart of an example process 400 for inserting a delay into a model. In some implementations, one or more process blocks of FIG. 4 may be performed by client device 210. Additionally, or alternatively, one or more process blocks of FIG. 4 may be performed by another device or a group of devices separate from or including client device 210, such as server device 220.

As shown in FIG. 4, process 400 may include receiving a model of a system (block 410). For example, client device 210 may receive the model from storage device 220. Additionally, or alternatively, the model may be stored in a data structure associated with client device 210, and client device 210 may receive the model by accessing the data structure.

In some implementations, the model may include a set of model elements that, when executed on a computing device, simulates behavior of a system, such as an information system (e.g., a digital control system, a signal processing system, etc.), a technical system (e.g., an airplane wing/aileron system); a natural system (e.g., human organ, a plant, etc.), a physical system (e.g., a bouncing ball, etc.), etc. For example, the system may include a set of physical elements that correspond to portions and/or components of the system. The system may be a dynamic system that changes its state, for example, as time progresses. The model elements may correspond to physical elements and may, when executed, simulate the behavior of the physical elements and/or the system.

In some implementations, the model may include a block diagram model. The block diagram model may include one or more blocks (e.g., model elements) that represent an operation of a component of the system (e.g., adding, subtracting, multiplying, etc.). The blocks may be connected via one or more signal lines (e.g., lines for carrying a signal associated with the blocks). A parameter may describe the behavior of a block in the context of the block diagram model, and may influence a manner in which the block behaves, when executed. For example, the parameter may identify an input to the block (and/or a system represented by the block), an output from the block, a manner in which the input is processed by the block, a manner in which the output is generated by the block, a state associated with the block, and/or other information that describes a behavior of the block.

In some implementations, the block diagram model may be represented graphically, textually, and/or stored in some form of internal representation. For example, a particular visual depiction may be used to represent the block, such as in a graphic model (e.g., a graphical block diagram).

In some implementations, the graphical model may include entities with relationships between the entities, and the relationships and/or the entities may have attributes associated with them. The entities may include model elements, such as blocks and/or ports. The relationships may include model elements, such as lines (e.g., connector lines) and references (e.g., textual labels). The attributes may include model elements, such as value information and meta information for the model element associated with the attributes. In some implementations, the graphical model may be associated with configuration information. The configuration information may include information for the graphical model, such as model execution information (e.g., numerical integration schemes, fundamental execution period, etc.), model diagnostic information (e.g., whether an algebraic loop should be considered an error or result in a warning), model optimization information (e.g., whether model elements should share memory during execution), model processing information (e.g., whether common functionality should be shared in code that is generated for a model), etc.

In some implementations, the graphical model may have executable semantics and/or may be executable. An executable graphical model may be a time based block diagram. A time based block diagram may consist, for example, of blocks connected by lines (e.g., connector lines). The blocks may consist of elemental dynamic systems such as a differential equation system (e.g., to specify continuous-time behavior), a difference equation system (e.g., to specify discrete-time behavior), an algebraic equation system (e.g., to specify constraints), a state transition system (e.g., to specify finite state machine behavior), an event based system (e.g., to specify discrete event behavior), etc. The lines may represent signals (e.g., to specify input/output relations between blocks or to specify execution dependencies between blocks), variables (e.g., to specify information shared between blocks), physical connections (e.g., to specify electrical wires, pipes with volume flow, rigid mechanical connections, etc.), etc. The attributes may consist of meta information such as sample times, dimensions, complexity (whether there is an imaginary component to a value), data type, etc. associated with the model elements.

In some implementations, one or more elements of the model (e.g., the graphical model) may be associated with a sample time. For example, the graphical model may include a block with a continuous sample time such as a continuous-time integration block that may integrate an input value as time of execution progresses. This integration may be specified by a differential equation. During execution, the continuous-time behavior may be approximated by a numerical integration scheme that is part of a numerical solver. The numerical solver may take discrete steps to advance the execution time, and these discrete steps may be constant during an execution (e.g., fixed step integration) or may be variable during an execution (e.g., variable-step integration).

In some implementations, the graphical model may include a block with a discrete sample time such as a unit delay block that may output values of a corresponding input after a specific delay. This delay may be a time interval and this interval may determine a sample time of the block. During execution, the unit delay block may be evaluated each time the execution time has reached a point in time where an output of the unit delay block may change. These points in time may be statically determined based on a scheduling analysis of the graphical model before starting execution.

In some implementations, the graphical model may include a block with an asynchronous sample time, such as a function-call generator block that may schedule a connected block to be evaluated at a non-periodic time. During execution, a function-call generator block may evaluate an input and when the input attains a specific value when the execution time has reached a point in time, the function-call generator block may schedule a connected block to be evaluated at this point in time and before advancing execution time.

As further shown in FIG. 4, process 400 may include determining optimization information associated with the model (block 420). For example, client device 210 may automatically determine the optimization information based on a type of optimization to be applied to the model (e.g., based on pipelining, resource sharing, adding model elements associated with additional delay, etc.). In some implementations, client device 210 may receive the optimization information from an optimization application (e.g., associated with server device 220). For example, server device 220 may determine the optimization information, and may provide the optimization information to client device 210.

In some implementations, the optimization information may include information that identifies how the model is to be optimized (e.g., modified to reduce an amount of hardware needed, to increase a speed of the system, to remove redundancy, etc.). For example, client device 210 may identify a target platform to implement the model (e.g., based on a model type). In some implementations, the target platform may include digital hardware that may be customized for a particular use, such as a field-programmable gate array ("FGPA"), an application-specific integrated circuit ("ASIC"), or the like. Based on the target platform, client device 210 may determine how the model is to be modified to be implemented on the target platform.

In some implementations, the optimization information may identify a quantity of delay to be inserted into the model (e.g., a quantity of cycles to be allocated to the model or to a part of the model). For example, the model may include a delay element (e.g., a model element that may add a quantity of delay to a signal associated with the model). The delay element may receive a signal (e.g., an input signal), may wait a quantity of time determined by the delay element, and may provide the signal (e.g., as an output signal) to another model element.

In some implementations, the optimization information may identify a quantity of delay associated with pipelining the model (e.g., or a part of the model). For example, a pipeline may include a set of elements (e.g., processors, threads, coroutines, etc.) arranged so that an output of a first element may be an input of a second element. A processing device (e.g., a microprocessor) may perform pipelining by starting execution of the second element before completing execution of the first element (e.g., by permitting a set of instructions in the pipeline concomitantly, with a first instruction at a different stage of execution than a second instruction). In some implementations, the pipeline may be implemented on hardware (e.g., an FPGA, an ASIC, etc.). For example, a data path (e.g., implemented on the hardware) may be partitioned into a set of functional units, with each functional unit corresponding to a stage of instruction execution. A processing device (e.g., associated with the FPGA, the ASIC, etc.) may perform pipelining by starting execution of a second functional unit in the data path (e.g., of the set of functional units) before completing execution of a first functional unit in the data path (e.g., of the set of functional units).

In some implementations, pipelining the model may reduce a critical path associated with the model, may increase a clock speed associated with the model, may reduce an amount of power consumed by the model, or the like. Based on the pipelining, client device 210 may determine a quantity of delay to insert into the model (e.g., a quantity of cycles to allocate to the model).

In some implementations, the optimization information may identify a quantity of delay associated with adding or removing a model element. For example, client device 210 may replace a model element in the model with a new model element. The new model element may be associated with a quantity of cycles associated with a clock rate of the system (e.g., a frequency at which a processing device associated with the system operates) that is greater than a quantity of cycles associated with the model element being replaced. Client device 210 may automatically determine an amount of cycles to allocate to the model based on the new model element (e.g., to adjust for the quantity of cycles associated with the new model element).

In some implementations, the optimization information may identify a quantity of delay associated with resource sharing. For example, the model may include a resource (e.g., a multiplier element, an adding element, etc.) that may be used in association with two or more other model elements. Client device 210 may automatically determine an amount of delay to insert into the model (e.g., an amount of cycles to allocate to the model or a part of the model) to allow the two or more other model elements to use the resource (e.g., at different times).

As further shown in FIG. 4, process 400 may include determining a region of interest associated with the model (block 430). For example, client device 210 may determine the region of interest based on the optimization information (e.g., based on determining which model elements are to be associated with an increased quantity of delay).

In some implementations, the region of interest may include a region of the model to which a quantity of delay is to be added (e.g., to which a quantity of cycles is to be allocated). The region of interest may include one or more interconnected model elements (e.g., one or more blocks). In some implementations, the region of interest may include a subset of model elements associated with the model.

In some implementations, the region of interest may include a maximum portion of the model that does not include any sequential element (e.g., an element associated with delay). For example, the model may include a block diagram model, and the region of interest may include a set of blocks connected by signal lines. The region of interest may include one or more signal lines entering the region of interest (e.g., signal inputs), and one or more signal lines exiting the region of interest (e.g., signal outputs). The region of interest may be bound by one or more delay blocks and/or inputs (e.g., ports) associated with the signal lines entering the sample region, and may be bound by one or more delay blocks associated with the signal lines exiting the region of interest. Thus, the region of interest may include a region of the block diagram model bound by inputs (e.g., associated with signal lines entering the region of interest) and/or delay blocks (e.g., associated with signal lines entering the region of interest and/or signal lines exiting the region of interest).

In some implementations, client device 210 may determine the region of interest by use of an application (e.g., a computer program) that analyzes the association of model elements (e.g., via a graph traversal). Based on the association between model elements, client device 210 may determine a combination of model elements (e.g., between an input signal and an output signal) that is not associated with a sequential element (e.g., a delay element). Based on the determination of model elements, client device 210 may determine the region of interest.

As further shown in FIG. 4, process 400 may include inserting sampling blocks based on the region of interest (block 440). For example, client device 210 may insert the sampling blocks into a portion of the model corresponding to the region of interest.

In some implementations, the sampling block may include a model element that modifies a data rate (e.g., a sampling rate) associated with a signal. In some implementations, the data rate may include a quantity of samples per unit time (e.g., seconds) taken from a continuous signal (e.g., a clock signal) to generate a discrete signal. The clock signal may include a signal used to coordinate the actions of the system (e.g., a circuit). The clock signal may oscillate between a high state (e.g., a quantity of the signal above a threshold value) and a low state (e.g., a quantity of the signal below a threshold value), and may be produced by a clock generator (e.g., an element associated with the system).

In some implementations, the clock signal may be associated with a clock rate. For example, the clock rate may represent a measure of a speed of the system, and may be associated with a frequency of a clock signal associated with a target platform (e.g., an FPGA, an ASIC, etc.). In some implementations, the clock rate may be greater than the data rate. For example, a target platform (e.g., a FPGA) may be capable of processing information at a particular clock rate (e.g., 30 MHz, or 30,000,000 cycles per second). A particular data rate (e.g., 300 Hz, or 300 cycles per second) associated with the target platform, however, may be less than the clock rate (e.g., by a factor of 100,000).

In some implementations, the sampling block may include an upsampling block. The upsampling block may include a model element that increases the data rate of a signal (e.g., that generates a modified data rate that is greater than an input data rate). Additionally, or alternatively, the sampling block may include a downsampling block. The downsampling block may include a model element that decreases the data rate of a signal (e.g., that generates a modified data rate that is less than an input data rate).

In some implementations, client device 210 may place the sampling blocks at signal lines entering and/or exiting the sample region. For example, client device 210 may place an upsampling block at a signal line entering the region of interest (e.g., client device 210 may upsample a signal input). Additionally, or alternatively, client device 210 may place a downsampling block at a signal line exiting the region of interest (e.g., client device 210 may downsample a signal output). In some implementations, client device 210 may upsample all signals entering the region of interest, and may downsample all signals exiting the region of interest. Additionally, or alternatively, client device 210 may upsample a signal to the same extent client device 210 may downsample the signal (e.g., an upsampling rate may match a downsampling rate). In this manner, a data rate of a signal entering the region of interest may be the same as a data rate of a signal exiting the region of interest.

In some implementations, the downsampling block may consume a quantity of delay. For example, the downsampling block may consume one unit of delay (e.g., one cycle) when inserted in the model. A delay element associated with the downsampling block (e.g., following the downsampling block) may be reduced by one unit (e.g., one cycle).

In some implementations, client device 210 may determine a first set of sampling blocks associated with a first region of interest, a second set of sampling blocks associated with a second region of interest, a third set of sampling blocks associated with a third region of interest, and so forth. In some implementations, an upsampling rate and/or a downsampling rate associated with the first set of sample blocks may be different from an upsampling rate and/or a downsampling rate associated with the second set of sampling blocks, the third set of sampling blocks, and so forth.

In some implementations, client device 210 may determine an amount of upsampling and/or downsampling based on the optimization information. For example, client device 210 may upsample and/or downsample by a sampling factor, k. The integer factor, k, may represent a multiplier that, when multiplied by the data rate, results in a modified data rate. For example, multiplying a data rate of 100 Hz by a sampling factor of 10 may result in a modified data rate of 1 KHz.

In some implementations, client device 210 may determine the sampling factor based on user input. For example, a user (e.g., of client device 210) may provide input that identifies a value for the upsampling and/or downsampling.

In some implementations, client device 210 may select a phase (e.g., an offset) of the signal to upsample and/or downsample (e.g., a phase of the input signal, a phase of the output signal, etc.). For example, the model may include a signal associated with a first data rate. Client device 210 may upsample the signal by a sampling factor of 10 (e.g., via an upsampling block) to produce a second data rate (e.g., an upsampled data rate). The second data rate may sample the signal an additional 10 times (e.g., may determine an additional 10 samples) per every 1 time the signal is sampled prior to upsampling. Client device 210 may downsample the signal (e.g., associated with the second data rate) by the sampling factor by selecting one of the 10 samples (e.g., related to a phase) to output (e.g., to return the signal to the first data rate).

In some implementations, based on the phase, client device 210 may determine a maximum longest path delay that may be inserted into the region of interest. The maximum longest path delay may include a maximum delay associated with a path in the region of interest such that the delay to be inserted in the path does not exceed k−1 (e.g., the maximum longest path delay does not exceed one less than the sampling factor). For example, client device 210 may determine a sampling factor of 20 associated with a signal (e.g., a signal exiting the region of interest). Based on the sampling factor, client device 210 may downsample the signal at a particular phase (e.g., a $20^{th}$ phase), and may insert a maximum longest path delay based on the particular phase (e.g., a delay of 19 cycles).

In some implementations, client device 210 may automatically determine k based on a quantity of delay to be inserted into a path in the system (e.g., a quantity of cycles to be allocated to the path in the system). For example, assume that the delay to be inserted in the path is 14 cycles. Based on the quantity of delay, client device 210 may determine that the sampling factor is to be 15, such that the delay to be inserted (e.g., 14 cycles) does not exceed k−1 (e.g., 15 cycles minus 1 cycle). Based on the delay, and based on the sampling factor, client device 210 may select the $15^{th}$ phase of the signal when downsampling.

As further shown in FIG. 4, process 400 may include adding a delay based on the sampling blocks and based on the optimization information (block 450). For example, the model may include a block model diagram, and client device 210 may insert a delay block into the region of interest.

In some implementations, client device 210 may insert the delay block based on the optimization information. For example, client device 210 may insert the delay block at a particular location in the region of interest, and/or may determine a quantity of delay associated with the delay block, based on the optimization information (e.g., based on determining a quantity of delay needed to achieve pipelining, to add and/or remove a block, to share resources, etc.).

In some implementations, client device 210 may place the delay block in the region of interest based on the sampling blocks. For example, client device 210 may place the delay block in the region of interest after an upsampling block, before a downsampling block, or the like. Additionally, or alternatively, client device 210 may determine a quantity of delay associated with the delay block based on the sampling blocks (e.g., based on a sampling factor).

As further shown in FIG. 4, process 400 may include generating and providing code associated with the delay (block 460). For example, the code may include information that identifies the model, the region of interest, the sampling blocks, and/or an amount of delay to be inserted into the region of interest (e.g., an amount of cycles to be allocated to the region of interest). In some implementations, the code may include a source code representation, a hardware description language ("HDL"), or the like. In some implementations, client device 210 may generate the code by use of a compiler and/or linker, and may provide the code to another device (e.g., server device 220). Additionally, or alternatively, client device 210 may generate the code by use of a design flow. The design flow may include one or more electronic design automation ("EDA") tools, such as an EDA tool chain, a bit stream synthesizer, or the like, for the design of one or more integrated circuits.

In some implementations, client device 210 may initiate the process of allocating cycles to the model (e.g., process 400) based on determining a target platform. For example, client device 210 may determine (e.g., automatically, based on user input, etc.) that the model is to be implemented on a particular target platform (e.g., a particular FGPA). Based on the target platform, client device 210 may determine a quantity of cycles to be allocated to the model (e.g., or part of the model) to permit the model to be optimized, and may allocate the quantity of cycles via process 400.

Although FIG. 4 shows example blocks of process 400, in some implementations, process 400 may include additional blocks, fewer blocks, different blocks, and/or differently arranged blocks than those depicted in FIG. 4. Additionally, or alternatively, two or more of the blocks of process 400 may be performed in parallel.

Figure 5A:
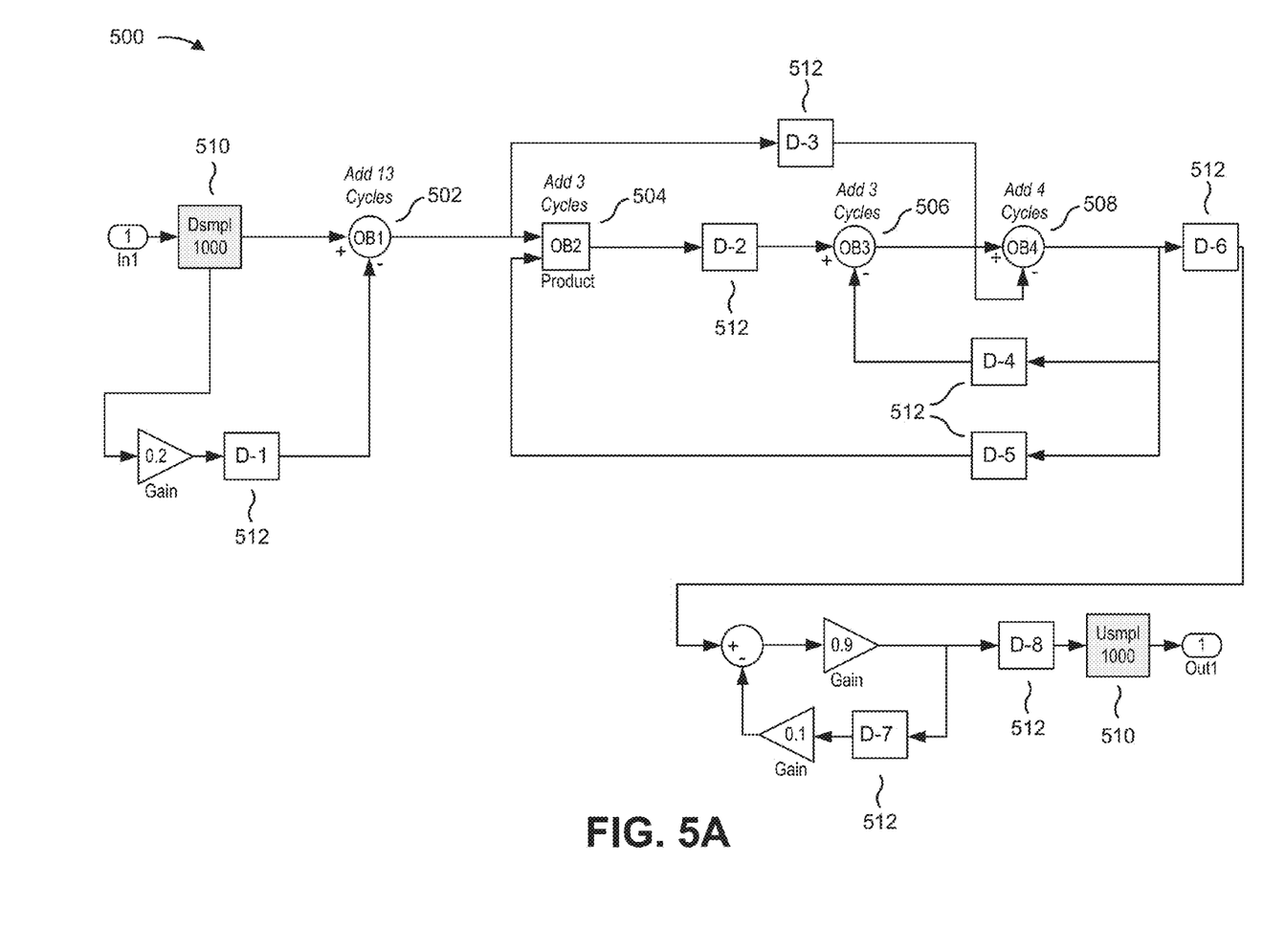
FIGS. 5A-5D are diagrams of an example implementation relating to the example process shown in FIG. 4.
Figure 5B:
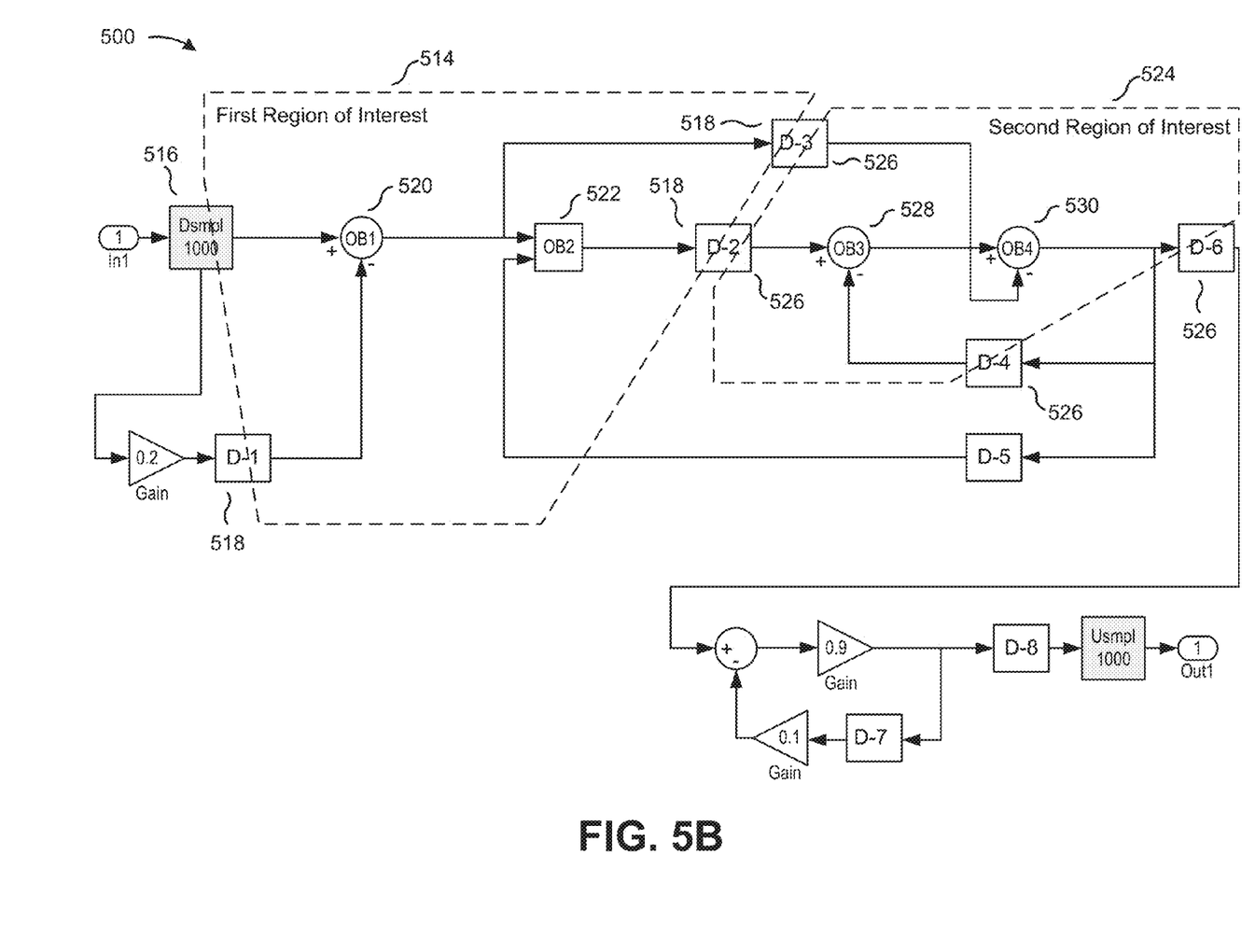
Figure 5C:
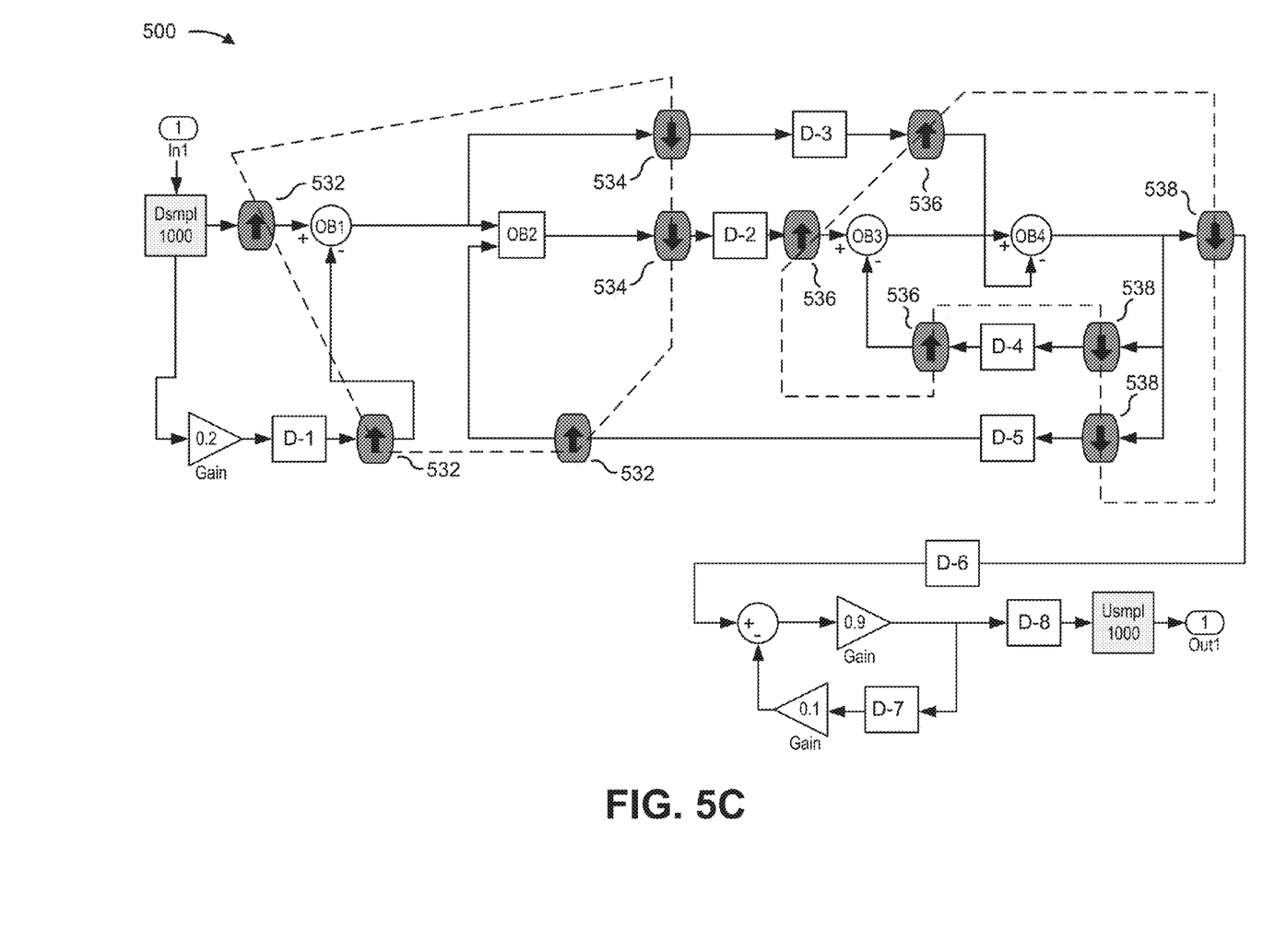

FIGS. 5A-5C are diagrams of an example implementation 500 relating to process 400 (FIG. 4). In example implementation 500, assume client device 210 receives a block diagram model of a circuit. Further, assume, based on optimization information associated with implementing the circuit on an FPGA, client device 210 determines that delays are to be added to the block diagram model.

As shown in FIG. 5A, and by reference number 502, the model may include a first operation block (e.g., "OB1"). Based on the optimization information (e.g., based on determining the delays that are to be added to the block diagram model in order to implement the model on the FPGA), client device 210 may determine that the first operation block needs an additional delay of 13 cycles. As shown by reference number 504, client device 210 may determine (e.g., based on the optimization information) that a second operation block (e.g., "OB2") needs an additional delay of 3 cycles. As shown by reference number 506, client device 210 may determine (e.g., based on the optimization information) that a third operation block (e.g., "OB3") needs an additional delay of 3 cycles. As shown by reference number 508, client device 210 may determine (e.g., based on the optimization information) that a fourth operation block (e.g., "01B4") needs an additional delay of 4 cycles. In this manner, client device 210 may determine additional delays to be added to the model in order to implement the model on the FPGA.

As shown by reference number 510, a signal entering the model may be downsampled and a signal exiting the model may be upsampled. The signal may be associated with a data rate. Additionally, the model may include a set of delay blocks, as shown by reference number 512 (e.g., "D-1," "D-2," D-3," "D-4," D-5," "D-6," "D-7," and "D-8").

As shown in FIG. 5B, and by reference number 514, client device 210 may determine a first region of interest. Client device 210 may determine the first region of interest by determining a first region of the model that does not include a sequential element. As shown by reference number 516, the first region of interest may be bounded by a downsampling block. As shown by reference number 518, the first region of interest may also be bound by a set of delay blocks (e.g., "D-1," "D-2", and "D-3"). The first region of interest may include the first operation block, shown by reference number 520. As shown by reference number 522, the first region of interest may also include the second operation block.

As shown by reference number 524, client device 210 may determine a second region of interest. The second region of interest may include a second region of the model that does not include a sequential element. As shown by reference number 526, the second region of interest may be bound by a set of delay blocks (e.g., "D-2," "D-3," "D-4," and "D-6") including two delay blocks that bound the first region of interest (e.g., "D-2" and "D-3"). The second region of interest may include the third operation block, as shown by reference number 528, and the fourth operation block, as shown by reference number 530.

As shown in FIG. 5C, and by reference number 532, client device 210 may insert upsampling blocks on the signal lines entering the first region of interest. The upsampling blocks may sample the incoming signals at a higher data rate (e.g., a first modified data rate). Client device 210 may upsample the data rate by a first sampling factor. Client device 210 may determine the first sampling factor based on determining the amount of delay to be inserted into the model (e.g., an amount of delay to be associated with the first operation block and the second operation block). As shown by reference number 534, client device 210 may insert downsample blocks on the signal lines exiting the first region of interest. The downsample blocks may downsample the signal by the same factor that the upsample blocks upsampled the signal (e.g., the first sampling factor). The downsample blocks may consume one unit of delay (e.g., one cycle) such that delay blocks following the first region of interest (e.g., "D-2" and "D-3") may be reduced by one unit of delay. In this manner, the data rate associated with the signal exiting the first sample region may be the same as the data rate associated with the signal entering the first sample region.

As shown by reference number 536, client device 210 may insert upsampling blocks on the signal lines entering the second region of interest. The upsampling blocks may sample the incoming signals at a higher data rate (e.g., a second modified data rate). Client device 210 may upsample the signal by a second sampling factor based on determining the amount of delay to be inserted in the model (e.g., an amount of delay to be associated with the third operation block and the fourth operation block). The second sampling factor may differ from the first sampling factor. Client device 210 may insert downsample blocks on the signal lines exiting the second sample region, as shown by reference number 538. The downsample blocks may consume one unit of delay (e.g., one cycle) such that delay blocks following the second region of interest (e.g., "D-4," "D-5," and "D-6") may be reduced by one unit of delay. In this manner, the signal associated with the second region of interest may be associated with a second modified data rate that differs from the data rate (e.g., associated with the model) and the first modified data rate (e.g., associated with the first region of interest).

Figure 5D:
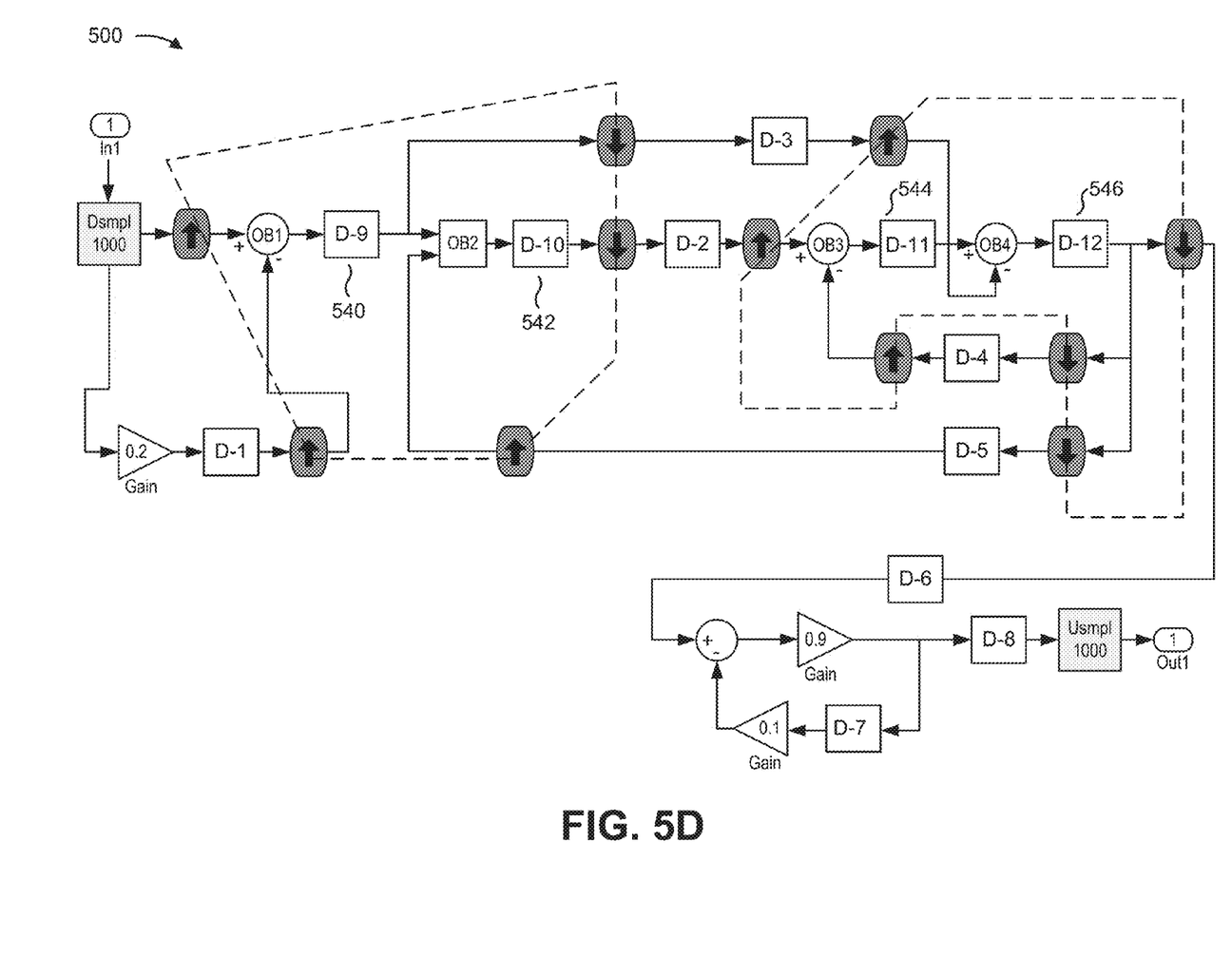

As shown in FIG. 5D, and by reference number 540, client device 210 may insert a ninth delay block (e.g., "D-9") on the signal line after the first operation block. The ninth delay block may be associated with a delay of thirteen cycles so as to satisfy the delay requirement of the first operation block (e.g., thirteen cycles). As shown by reference number 542, client device 210 may insert a tenth delay block (e.g., "D-10") after the second operation block. The tenth delay block may be associated with a delay of three cycles, so as to satisfy the delay requirement of the second operation block (e.g., four cycles). In this manner, client device 210 may add a delay to the first sample region based on the optimization information. The blocks in the first region of interest (e.g., the first operation block and the second operation block) may operate based on the upsampled signal (e.g., at the first modified data rate). The blocks may complete a quantity of cycles before providing an output signal to be downsampled (e.g., passed through a downsampling block as the signal exits the first region of interest). The combination of upsampling, increased delay, and downsampling may allow the signal, associated with a data rate, to enter the first region of interest, complete a quantity of cycles, and exit the region of interest at a data rate that is the same data rate as the entering signal.

As shown by reference number 544, client device 210 may insert an eleventh delay block (e.g., "D-11") on the signal line after the third operation block. The eleventh delay may be associated with a delay of three cycles so as to satisfy the delay requirement of the third operation block (e.g., three cycles). As shown by reference number 546, client device 210 may insert a twelfth delay block (e.g., "D-12") on the signal line after the fourth operation block. The twelfth delay block may be associated with a delay of four cycles so as to satisfy the delay requirement of the fourth operation block. In this manner, client device 210 may add a delay to the second sample region based on the optimization information. The blocks in the second region of interest (e.g., the third operation block and the fourth operation block) may operate based on the upsampled signal (e.g., at the second modified data rate). The blocks may complete a quantity of cycles before providing an output signal to be downsampled (e.g., passed through a downsampling block as the signal exits the second region of interest). The combination of upsampling, increased delay, and downsampling may allow the signal to enter the second region of interest, complete a quantity of cycles, and exit the region of interest at a data rate that is the same data rate as the entering signal.

In this manner, client device 210 may use differences between the data rate and the modified data rates (e.g., the first modified data rate and the second modified data rate) to add additional cycles (e.g., fast delays) to the first region of interest and the second region of interest while maintaining an overall latency associated with the model.

As indicated above, FIGS. 5A-5D are provided merely as an example. Other examples are possible and may differ from what was described with regard to FIGS. 5A-5D.

Implementations described herein may allow a client device to automatically modify a data rate within a region of interest of a model to permit the client device to insert a quantity of delay (e.g., allocate a quantity of cycles) into the region of interest without affecting the overall behavioral characteristics of the model.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in conjunction with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Some implementations are described herein as occurring automatically. However, in some implementations, a process block and/or a combination of process blocks may be associated with user input. For example, a process block and/or a combination of process blocks may include and/or be based upon receiving an indication, a selection, an input, or the like, from a user of a device described herein.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device comprising:
   one or more processors, implemented at least partially in hardware to:
   receive information associated with a model;
   determine, based on the received information, an amount of delay to be inserted into the model;
   determine a sampling factor,
      the sampling factor including a factor by which a first data rate, associated with a signal, is to be modified into a second data rate,
      the second data rate being greater than the first data rate; determine a region of interest,
   the region of interest including at least one block associated with the model;
   insert, into the model at a first location prior to the region of interest, an upsampling block that upsamples the signal entering the region of interest based on the sampling factor;
   insert, into the model at a second location after the region of interest, a downsampling block that downsamples the signal exiting the region of interest based on the sampling factor,
      the downsampling block being associated with a unit of delay;
   convert the unit of delay into a fast delay block, corresponding to the amount of delay, based on a difference between the first data rate and the second data rate,
      the fast delay block being associated with the second data rate;
   insert, into the model, the fast delay block at a third location in the region of interest to permit a use of additional data cycles without altering a latency associated with the model;
   generate code associated with the region of interest, the upsampling block, the downsampling block, and the fast delay block; and
   provide the code.

2. The device of claim 1, where the one or more processors, when receiving the information, are further to:
   receive information that identifies how a resource associated with the model is to be shared; and
   where the one or more processors, when determining the amount of delay, are further to:

determine the amount of delay based on how the resource is to be shared.

3. The device of claim 1, where the one or more processors, when determining the sampling factor are further to:
   determine a phase associated with the signal; and
   determine the sampling factor based on the phase and based on the amount of delay such that the delay does not exceed one less than the sampling factor.

4. The device of claim 1, where the one or more processors, when determining the sampling factor, are further to:
   determine the sampling factor based on user input.

5. The device of claim 1, where the first data rate is an original data rate; and
   where the downsampling block converts the second data rate to the original data rate.

6. The device of claim 1, where the one or more processors, when inserting the upsampling block, are further to:
   insert a plurality of upsampling blocks that upsample a plurality of signals associated with the region of interest; and
   where the one or more processors, when inserting the downsampling block, are further to:
      insert a plurality of downsampling blocks that downsample a plurality of signals associated with the region of interest.

7. The device of claim 1, where the one or more processors, when converting the unit of delay into the fast delay block, are further to:
   convert the unit of delay into a plurality of fast delay blocks; and
   where the one or more processors, when inserting the fast delay block, are further to:
      insert the plurality of fast delay blocks in the region of interest.

8. A non-transitory computer-readable medium storing instructions, the instructions comprising:
   one or more instructions that, when executed by one or more processors, cause the one or more processors to:
      receive information associated with a model;
      determine, based on the received information, a quantity of delay to be inserted into the model;
      determine a sampling factor,
         the sampling factor including a factor by which a first data rate, associated with a signal, is to be modified into a second data rate associated with the signal, the second data rate being greater than the first data rate;
      determine a region of interest,
         the region of interest including at least one block associated with the model;
      insert, into the model at a first location prior to the region of interest, an upsampling block that upsamples the signal entering the region of interest based on the sampling factor;
      insert, into the model at a second location after the region of interest, a downsampling block that downsamples the signal exiting the region of interest based on the sampling factor,
         the downsampling block being associated with a unit of delay;
      convert the unit of delay into a fast delay block, corresponding to the quantity of delay, based on a difference between the first data rate and the second data rate;
      insert, into the model, the fast delay block at a third location in the region of interest;
      generate code associated with the region of interest, the upsampling block, the downsampling block, and the fast delay block; and
      provide the code.

9. The computer-readable medium of claim 8, where the one or more instructions, that cause the one or more processors to receive the information, further cause the one or more processors to:
   receive information that identifies how the model is to be pipelined; and
   where the one or more instructions, that cause the one or more processors to determine the quantity of delay, further cause the one or more processors to:
      determine the quantity of delay based on how the model is to be pipelined.

10. The computer-readable medium of claim 8, where the one or more instructions, that cause the one or more processors to determine the quantity of delay, further cause the one or more processors to:
   determine a maximum amount of delay that may be inserted into the model; and
   where the one or more instructions, that cause the one or more processors to determine the sampling factor, further cause the one or more processors to:
      determine a phase associated with the signal based on the maximum amount of delay; and
      determine the sampling factor based on the phase.

11. The computer-readable medium of claim 8, where the one or more instructions, that cause the one or more processors to determine the sampling factor, further cause the one or more processors to:
   determine the sampling factor based on the information.

12. The computer-readable medium of claim 8, where the first data rate and the second data rate do not exceed a clock rate associated with the model.

13. The computer-readable medium of claim 8, where the second data rate corresponds to a clock rate associated with the model.

14. The computer-readable medium of claim 8, where the one or more instructions, that cause the one or more processors to determine the region of interest, further cause the one or more processors to:
   determine a loop associated with the model; and
   determine the region of interest based on the loop,
      the region of interest including the loop.

15. A method comprising:
   receiving information associated with a model;
      the receiving the information being performed by a device;
   determining, based on the received information, an amount of delay to be inserted into the model,
      the determining the amount of delay being performed by the device;
   determining a sampling factor,
      the sampling factor including a factor by which a first data rate, associated with a signal, is to be modified into a second data rate associated with the signal, the second data rate being greater than the first data rate, and
      the determining the sampling factor being performed by the device;
   determining a region of interest,
      the region of interest including at least one block associated with the model, and
      the determining the region of interest being performed by the device;

inserting, into the model at a first location prior to the region of interest, an upsampling block that upsamples the signal entering the region of interest based on the sampling factor,
  the inserting the upsampling block being performed by the device;
inserting, into the model at a second location after the region of interest, a downsampling block that downsamples the signal exiting the region of interest based on the sampling factor,
  the downsampling block being associated with a unit of delay, and
  the inserting the downsampling block being performed by the device;
converting the unit of delay into a fast delay block, corresponding to the amount of delay, based on a difference between the first data rate and the second data rate,
  the fast delay block being associated with the second data rate, and
  the converting the unit of delay being performed by the device;
inserting, into the model, the fast delay block at a third location in the region of interest,
  the inserting the fast delay block being performed by the device;
generating code associated with the model,
  the generating the code being performed by the device; and
providing the code by the device,
  the providing the code being performed by the device.

16. The method of claim 15, where receiving the information further comprises:
  receiving information that identifies a block to be added to the model; and
  where determining the amount of delay further comprises:
    determining the amount of delay based on the added block.

17. The method of claim 15, where receiving the information further comprises:
  receiving information that identifies a block to be removed from the model; and
  where determining the amount of delay further comprises:
    determining the amount of delay based on the removed block.

18. The method of claim 15, where determining the sampling factor further comprises:
  determining the sampling factor automatically.

19. The method of claim 15, where determining the sampling factor further comprises:
  determining a maximum sampling factor; and
  determining the sampling factor based on the maximum sampling factor.

20. The method of claim 15, where the region of interest is a first region of interest;
  where the amount of delay is a first amount of delay;
  where the sampling factor is a first sampling factor;
  where the upsampling block is a first upsampling block;
  where the downsampling block is a first downsampling block;
  where the unit of delay is a first unit of delay;
  where the fast delay block is a first fast delay block;
  the method further comprising:
    determining a second amount of delay to be inserted into the model based on the information,
      the second amount of delay being different than the first amount of delay;
    determining a second sampling factor,
      the second sampling factor including a factor by which a third data rate associated with a second signal is to be modified into a fourth data rate,
      the second sampling factor being different than the first sampling factor;
    determining a second region of interest,
      the second region of interest including a region of the model without a sequential element, and
      the second region of interest being different than the first region of interest;
    inserting, into the model at a fourth location, a second upsampling block that upsamples the second signal entering the second region of interest based on the second sampling factor;
    inserting, into the model at a fifth location, a second downsampling block that downsamples the second signal exiting the second region of interest based on the second sampling factor,
      the second downsampling block being associated with a second unit of delay;
    converting the second unit of delay into a second fast delay block, corresponding to the second amount of delay, based on a difference between the third data rate and the fourth data rate,
      the second fast delay block being associated with the fourth data rate;
    inserting the second fast delay block in the second region of interest;
    generating additional code associated with the model; and
    providing the additional code.

* * * * *